United States Patent
Zeng et al.

(10) Patent No.: US 9,881,092 B2
(45) Date of Patent: Jan. 30, 2018

(54) METHOD AND APPARATUS FOR CONTENT-AWARE ROLE MODELING AND RECOMMENDATION

(75) Inventors: Cheng Zeng, Hubei (CN); Jian Wang, Hubei (CN); Liang Hong, Hubei (CN); Jilei Tian, Beijing (CN); Xiaogang Yang, Beijing (CN); Huanhuan Cao, Beijing (CN)

(73) Assignee: WSOU Investments, LLC, Los Angeles, CA (US)

( * ) Notice: Subject to any disclaimer, the term of this patent is extended or adjusted under 35 U.S.C. 154(b) by 274 days.

(21) Appl. No.: 14/114,277

(22) PCT Filed: Apr. 29, 2011

(86) PCT No.: PCT/CN2011/073564
§ 371 (c)(1),
(2), (4) Date: Dec. 26, 2013

(87) PCT Pub. No.: WO2012/145931
PCT Pub. Date: Nov. 1, 2012

(65) Prior Publication Data
US 2014/0122507 A1     May 1, 2014

(51) Int. Cl.
*G06F 17/30* (2006.01)
*G06Q 30/02* (2012.01)

(52) U.S. Cl.
CPC .. *G06F 17/30867* (2013.01); *G06F 17/30528* (2013.01); *G06Q 30/0282* (2013.01)

(58) Field of Classification Search
CPC ......... G06F 17/30867; G06F 17/30761; G06F 17/3053
See application file for complete search history.

(56) References Cited

U.S. PATENT DOCUMENTS

| | | | | |
|---|---|---|---|---|
| 6,460,036 B1* | 10/2002 | Herz | ............... | G06F 17/30867 348/E7.056 |
| 7,181,438 B1* | 2/2007 | Szabo | ............... | G06F 17/30522 |

(Continued)

FOREIGN PATENT DOCUMENTS

CN         101334792 A      12/2008

OTHER PUBLICATIONS

Costa et al. COReS: Contextaware, Ontology-based Recommender system for Service recommendation. 2007. Proc. CAiSE'07 Workshop on Ubiquitous Mobile Information and Collaboration Systems. 15 pages.*

(Continued)

*Primary Examiner* — James E Richardson
(74) *Attorney, Agent, or Firm* — Sean D. Burdick

(57) ABSTRACT

An example approach is provided for providing recommendations to a user based on user's role derived from the context information and an advanced user profile. A recommendation platform processes context information to determine one or more roles associated with a user. Next, the recommendation platform calculates at least one level of similarity between the one or more roles and one or more other roles associated with one or more other users. Then, the recommendation platform determines recommendation information associated with the one or more other users based, at least in part, on the at least one level of similarity. Next, the recommendation platform processes the recommendation information to generate one or more recommendations for the user.

14 Claims, 14 Drawing Sheets

(56) References Cited

U.S. PATENT DOCUMENTS

| | | | |
|---|---|---|---|
| 9,065,727 B1* | 6/2015 | Liu | H04L 43/04 |
| 2005/0066011 A1* | 3/2005 | Wicks | G06F 11/3409 |
| | | | 709/217 |
| 2008/0126176 A1* | 5/2008 | Iguchi | G06Q 30/0201 |
| | | | 705/7.29 |
| 2009/0144780 A1 | 6/2009 | Toebes et al. | |
| 2009/0164442 A1* | 6/2009 | Shani | G06F 17/30699 |
| 2010/0011020 A1 | 1/2010 | Bouzid et al. | |
| 2010/0076968 A1* | 3/2010 | Boyns | G06F 17/30241 |
| | | | 707/732 |
| 2010/0235241 A1* | 9/2010 | Wang | G06Q 30/02 |
| | | | 705/14.66 |
| 2010/0312644 A1* | 12/2010 | Borgs | G06Q 10/10 |
| | | | 705/14.55 |
| 2011/0125678 A1* | 5/2011 | Partridge | G06Q 30/02 |
| | | | 706/12 |
| 2011/0225139 A1* | 9/2011 | Wang | G06F 17/30867 |
| | | | 707/709 |
| 2012/0078725 A1* | 3/2012 | Maitra | G06Q 30/0269 |
| | | | 705/14.66 |
| 2012/0158622 A1* | 6/2012 | Mital | G06Q 50/01 |
| | | | 706/12 |
| 2012/0210240 A1* | 8/2012 | Neystadt | G06Q 30/0282 |
| | | | 715/739 |
| 2012/0290434 A1* | 11/2012 | Moritz | G06Q 30/0261 |
| | | | 705/26.7 |
| 2015/0095278 A1* | 4/2015 | Flinn | G06F 17/2785 |
| | | | 706/52 |

OTHER PUBLICATIONS

Chen. Context-Aware Collaborative Filtering System: Predicting the User's Preference in the Ubiquitous Computing Environment. In Proceedings of the First international conference on Location- and Context-Awareness (LoCA'05), Thomas Strang and Claudia Linnhoff-Popien (Eds.). Springer-Verlag, Berlin, Heidelberg, pp. 244-253.*

Göker et al. (Workshop on Case Based Reasoning and Personalization. 2002. 6th European Conference on Case Based Reasoning ECCBR 2002. Aberdeen, Scotland. 34 pages.*

Xue et al. User Language Model for Collaborative Personalized Search. 2009. ACM Transactions of Information Systems. vol. 27, No. 2, Article 11.*

International Search Report and Written Opinion recieved for corresponding Patent Cooperation Treaty Application No. PCT/CN2011/073564 dated Feb. 9, 2012, 10 pages.

Office Action for corresponding Chinese Patent Application No. 201180071902.9, dated Jan. 25, 2017, English Language Summary Included, 8 pages.

* cited by examiner

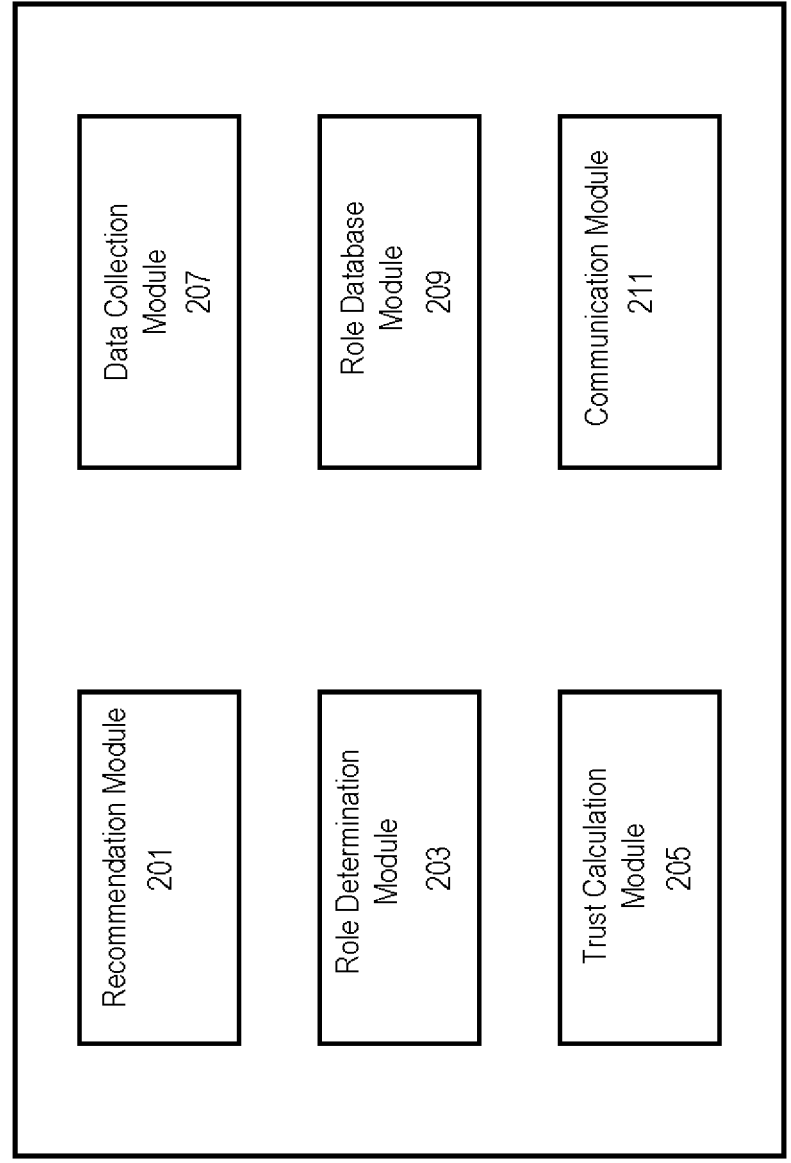

METHOD AND APPARATUS FOR CONTENT-AWARE ROLE MODELING AND RECOMMENDATION

RELATED APPLICATION

This application was originally filed as Patent Cooperation Treaty Application No. PCT/CN2011/073564 filed Apr. 29, 2011.

BACKGROUND

Service providers and device manufacturers (e.g., wireless, cellular, etc.) are continually challenged to deliver value and convenience to consumers by, for example, providing compelling network services. One area of development has been the use of recommendation systems to provide users with suggestions or recommendations for content, items, etc. available within the services and/or related applications (e.g., recommendations regarding people, places, or things of interest such as companions, restaurants, stores, vacations, movies, video on demand, books, songs, software, articles, news, images, etc.). For example, a typical recommendation system may suggest an item to a user based on a prediction that the user would be interested in the item—even if that user has never considered the item before—by comparing the user's preferences to one or more reference characteristics. Such recommendation systems historically have been based on collaborative filters that rely on often large amounts of user data (e.g., historical rating information, use history, etc.). However, such user data often is not available or has not been collected with respect to a particular service or application, especially if the user is new to the service, service or the application is new.

Some Example Embodiments

Therefore, there is a need for an approach for making a recommendation to a user based on context information and a role comparison.

According to one embodiment, a method comprises processing and/or facilitating a processing of context information to determine one or more roles associated with a user. The method also comprises causing, at least in part, a calculation of at least one level of similarity between the one or more roles and one or more other roles associated with one or more other users. The method further comprises determining recommendation information associated with the one or more other users based, at least in part, on the at least one level of similarity. The method also comprises processing and/or facilitating a processing of the recommendation information to generate one or more recommendations for the user.

According to another embodiment, an apparatus comprises at least one processor, and at least one memory including computer program code, the at least one memory and the computer program code configured to, with the at least one processor, cause, at least in part, the apparatus to process context information to determine one or more roles associated with a user. The apparatus is also caused to calculate at least one level of similarity between the one or more roles and one or more other roles associated with one or more other users. The apparatus is further caused to determine recommendation information associated with the one or more other users based, at least in part, on the at least one level of similarity. The apparatus is also caused to process the recommendation information to generate one or more recommendations for the user.

According to another embodiment, a computer-readable storage medium carries one or more sequences of one or more instructions which, when executed by one or more processors, cause, at least in part, an apparatus to process context information to determine one or more roles associated with a user. The apparatus is also caused to calculate at least one level of similarity between the one or more roles and one or more other roles associated with one or more other users. The apparatus is further caused to determine recommendation information associated with the one or more other users based, at least in part, on the at least one level of similarity. The apparatus is also caused to process the recommendation information to generate one or more recommendations for the user.

According to another embodiment, an apparatus comprises means for processing and/or facilitating a processing of context information to determine one or more roles associated with a user. The apparatus also comprises means for causing, at least in part, a calculation of at least one level of similarity between the one or more roles and one or more other roles associated with one or more other users. The apparatus further comprises means for determining recommendation information associated with the one or more other users based, at least in part, on the at least one level of similarity. The apparatus also comprises means for processing and/or facilitating a processing of the recommendation information to generate one or more recommendations for the user.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes)

disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2 is a diagram of the components of a recommendation platform, according to one embodiment;

DESCRIPTION OF SOME EMBODIMENTS

Examples of a method, apparatus, and computer program for making a recommendation to a user based on context information and a role comparison are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
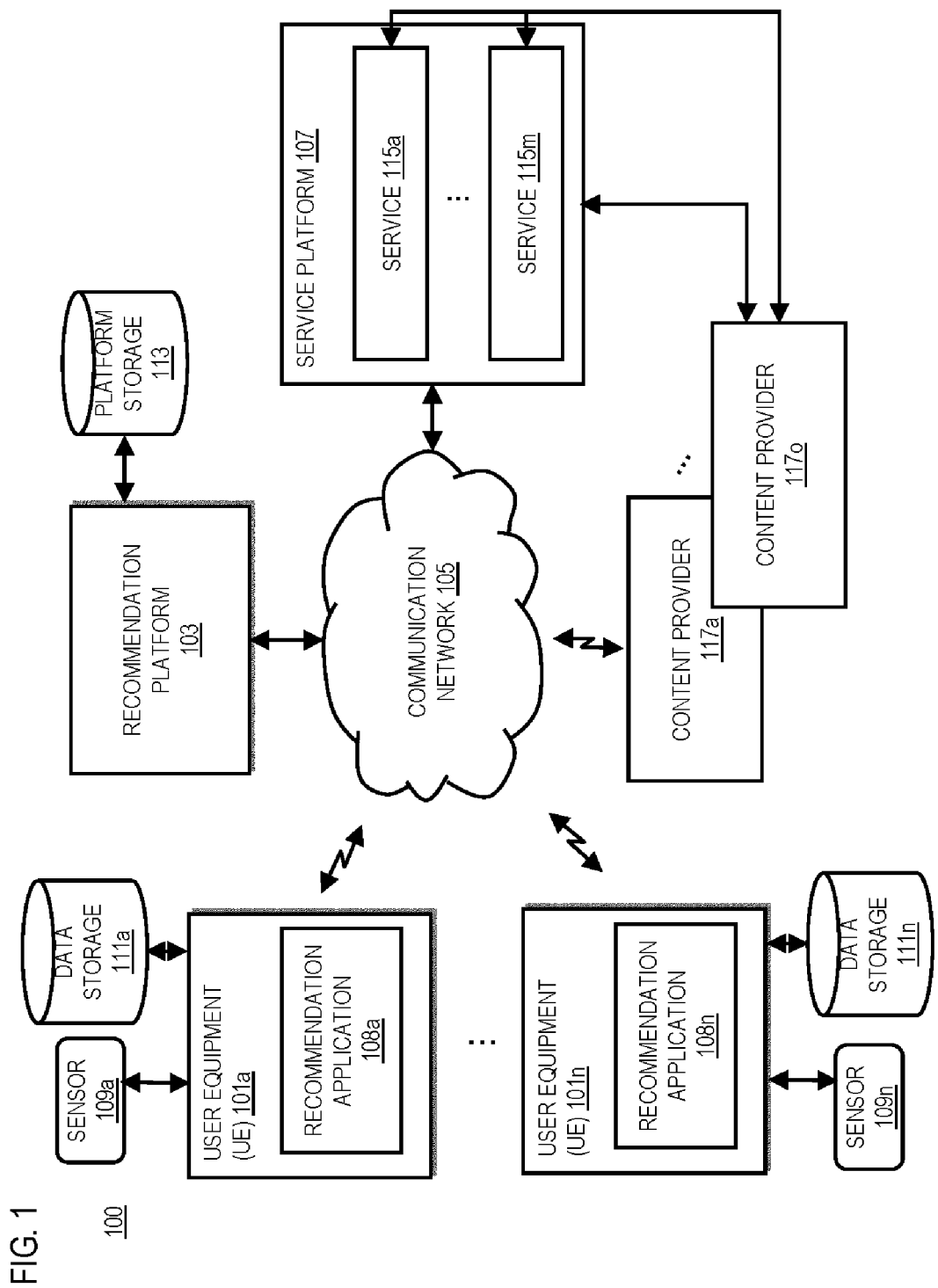
FIG. 1 is a diagram of a system capable of making a recommendation to a user based on context information and a role comparison, according to one embodiment.

FIG. 1 is a diagram of a system capable of making a recommendation to a user based on context information and a role comparison, according to one embodiment. The popularization of smart phones brings opportunities for exploiting personalized recommendation based on rich context information and mobile social networks. As previously discussed, recommendation systems provide users with a number of advantages over traditional methods of search in that recommendation systems not only circumvent the time and effort of searching for items of interest, but they may also help users discover items that the users may not have found themselves. However, recommendation systems can be very complex due to the number of variables, functions, and data that are used to create models (e.g., collaborative filtering) for generating recommendations. By way of example, a recommendation system for a particular application may take into consideration variables such as items viewed, item viewing times, items searched, items downloaded/uploaded, items purchased, items added to a wish list, shopping cart, or favorites list, items rated and how they were rated, etc. A recommendation system may also include complex algorithms to generate a recommendation based on these variables. Nevertheless, even when the numerous variables and functions have been satisfied, a recommendation system generally still requires sufficient data (e.g., item data, user data, etc.) to effectively seed its models to produce user suggestions. Thus, the conventional approach of collaborative-based recommendations is not suitable for making recommendations for new information that does not yet exist in the model. Further, because the conventional approach with models is derived based on the usage interaction with their respective applications, and thus are very application-specific and a generic recommendation that is not specific to an application may be difficult to generate. In addition, the conventional approach does not consider the context information in depth, wherein the context information is to be well-reflected in the generic recommendation approach. For these various reasons, personalizing the models is difficult to be able to generate more personalized recommendations.

In other words, the collaborative filtering that is widely used in recommendation systems involves cold-start problems, sparseness of useful information, and internal attacks on the recommendation system. To overcome these issues, trust calculations have been proposed to improve the reliability of a recommendation and to provide reasoning for making a recommendation. However, current trust calculation approaches only consider a user's trust statements and the similarity of a user's rating history, which oversimplify the trust relationship. The traditional technique for making a recommendation based on context and trust focuses on individual intelligence and doesn't take common knowledge among different users into account. The common knowledge among similar users can be modeled as roles.

The above-mentioned problems may be solved by assigning one or more roles to a user based on the user's context information and preferences, for example. The one or more roles may be matched and/or compared with one or more roles of another user. Based on a degree of matching, a trust factor may be calculated, which may serve as a source for basing a recommendation that is based on the available context information and preferences of another user in the absence, or in addition to, the user's own available context information. Arguably, two users may gain more trust if they play, or have played, the same or similar roles.

Such a concept of comparing roles to develop a level of trust between multiple users may be dubbed as a role-based trust social network (RTSN). Role modeling for a RTSN may be automatically mined so that the user's role may be recognized based on user context information and advanced user profiles. For example, a user can serve as a husband at home on the weekend which may be one role, and the user's role may change to a traveler if the user travels from home to London, for example. RTSN may use a user's role, e.g. a role as a shopper, and provide pertinent advice for shopping related content. The role modeling may take user profile and context into account, and build a role-based social trust network to achieve improved performance of a contextual recommendation with efficient and accurate inference.

To address the above-mentioned problems with basic collaborative filtering, a system 100 of FIG. 1 introduces the capability to make a recommendation to a user based on context information and a role comparison based on similarities in roles between the users and a trust factor that is calculated to enhance the recommendation process. As discussed above, a user may play different roles in his/her daily life. This implies that a user's role can change dynamically as the user's context changes. For example, a user's role transfers from a "Shopping Customer" to a "Subway Passenger" when the user leaves the supermarket and takes a subway. The system 100 may assume that users that are assigned a similar or the same role likely share the same interests, preferences and/or behavior patterns. Because users that play similar or same roles share similar interests, opinions, preferences and behavior patterns, a user's role may be considered as a high-level abstract of a group of users with certain similarities. Such a high-level abstract of users is a key factor in building a trust network from social networks and/or calculating a trust factor between a pair of users.

In embodiments, an efficient approach to mining and recognizing a user's potential roles is from context information and an advanced user profile (AUP) that includes the user's behavior patterns, preferences, demographics such as age, gender, education, etc. Incorporating the AUP into the role calculation is helpful because the incorporation results in a more accurate role determination than a role determination based solely on context information. A role concept lattice (hierarchy) may be generated from the mined roles, which provides a basis for mapping between the mined roles and any manually constructed or inputted roles. For example, a user may indicate that he likes to eat lobster, but his behavior patterns or context information do not automatically indicate this preference. Because role is an important factor for calculating a trust factor in RTSN, the trust calculation may consider a role type that may indicate whether the role is a continuous role or a periodic role, and any role relations such as Include, Included, Similar, Same etc. As discussed above, users that have the same role likely have similar interests and can, therefore, have the same service needs. The trust factor may be based on the role set of each user. For example, the same continuous roles shared between users will have high trust factor, the same periodic roles will have a medium trust factor, while no same role shared between users will lead to a low trust factor. Personalized services and information available through the RTSN are linked to a user through the user's assigned one or more roles. A benefit of user role mining and RTSN is an improvement in the accuracy of a recommendation and a reduction in useless spam attacks that a user may experience. Such an improvement may offer personalized and targeted services that a user may desire.

In embodiments, to build a RTSN it is helpful to automatically mine and recognize roles from user context information and user profiles. Building a RTSN may include steps of AUP modeling, role mining and recognizing and building the RTSN.

AUP modeling incorporates mining an inherent relationship between User Profiles (UP's) and context such as user behavior. AUP modeling also involves providing modeling of dynamic information such as context information, as well as the common knowledge learned from similar users. Role mining and recognizing involves mining and recognizing a user's role from context information and a user profile. Building the RTSN involves calculating trust based on a role set of each user. And, as discussed above, the same continuous roles may have a high trust factor, the same periodic roles may have a medium trust factor, and no matching roles between users may result in a low trust factor.

With regard to the AUP, the AUP is built by Resource Description Framework (RDF), which describes user's static and dynamic information, such as demographic information, social information, behavior pattern, and preference. The user's habit, preference and behavior may be learned with a data mining approach such that the logged data is collected from personal mobile devices. Rules for logging data may be described as rules given in a triple format such as <time, scene, behavior> and stored as instances of a preference class in AUP. Variations in time, for example, may be used to determine whether a role is continuous or periodic. Time may also be used to determine, for instance, whether a role shared between users should be labeled as same or similar. For example, users that share the sale role at different times may not actually be experiencing the same role. Take a breakfast establishment that turns into a night club in the evening hours, for example. A customer that attends the establishment for breakfast may have a different role than a different customer (or even the same customer) that visits the establishment 15 hours later.

With regard to role, as discussed above, the common features among a group of users can be classified as roles. Generally speaking, the role can be classified as the continuous role and periodic role according to the temporal features that a user plays. The continuous role denotes long-term and steady roles, while the periodic role can take effect in a short-time. Role ontology can be used to semi-automatically tag corresponding information fragments in AUP of each user. For instance, a preference rule such as <business hours, on bus, play music> is possibly tagged with a periodic role 'music lover'. By role tagging, the fragments of common knowledge may be indirectly saved into AUPs of similar users. Roles may also be considered as role sets that represent all or some of the roles that a user has played or been assigned. Roles sets may be aggregated and compared in a similar fashion as individual roles, but may be involved with more complex recommendation rules because a role set would introduce additional factors for determining a trust factor. For example, a user that has a role set that includes husband, traveler and shopper, when compared to a user that has a role set of wife, traveler, shopper, may be compared as being similar because they are involved in the same types of activities and they are married.

With regard to the above mentioned trust factor, trust may be defined as a statement by a user A toward a user B that means user A consistently finds any reviews and/or ratings that user B makes valuable. Trust in a person may be considered to be a commitment to an action based on a belief that future actions made by that person may lead to a positive outcome. Trust may be asymmetric with regard to which user is the trusting entity. Trust, as discussed above, may be an important factor in determining whether to make a recommendation to a user based on the available context information and preference information of another user. Having a high trust factor makes the likelihood high that accepting a recommendation that is made based on the other user similarly may lead to a positive outcome. A calculation to determine a trust factor between a pair of users may consider an explicit trust statement made by one of the users, a similarity between the role sets of the users and/or a similarity between the users' ratings (user profiles) or preferences, for example. Building an RTSN may incorporate aggregating every calculated trust factor between multiple users as well as considering trust and distrust propagation.

As shown in FIG. 1, the system 100 comprises user equipments (UEs) 101a-101n having connectivity to a recommendation platform 103 via a communication network 105. In this description, the UEs 101a-101n may be collectively referred as the UE 101. The UE 101 also has connectivity to a service platform 107 and a content provider 117 via the communication network 105. The UE 101 may include recommendation applications 108a-108n, collectively referred in this description as the recommendation application 108, which communicates with the recommendation platform 103 to retrieve the information regarding recommendations. The recommendation platform 103 may receive data from the UE 101 that may be considered for recommendations. The recommendation platform 103 may exist within the UE 101, or within the service platform 107, or independently. The data provided to the recommendation platform 103 may include data from sensors 109a-109n (in this description, the sensors 109a-109n may be collectively referred as the sensor 109) connected to the UE 101. The sensor 109 may include a location sensor, a speed sensor, an audio sensor, brightness sensor, etc. In this description, data storages 111a-111n may be referred as the data storage 111. The data storage 111 may be connected to the UE 101 to store the data captured via the sensor 109 as well as any other types of data, models, rules, etc. The recommendation platform 103 then may determine the recommendation rules and/or models based on various types of information. The recommendation platform 103 may also be connected to the platform storage medium 113, which can store various types of data including the rules, models, updates, etc. The recommendation platform 103 may also retrieve recommendation rules and/or models as well as updates for the rules and/or models from one or more services 115a-115m included in the service platform 107. The services 115a-115m can be collectively referred as the service 115. The rules and/or models and/or the updates may also exist in the one or more content providers 117a-117o, which may also be collectively referred as the content provider 117. Thus, the service platform 107 may include one or more services 115a-115m, the one or more content providers 117a-117o, or other content sources available or accessible over the communication network 105.

In one embodiment, the system 100 determines to retrieve the recommendation model from a general collaborative model based on user context information, user preferences, other user context information, other user preferences and/or a trust factor. By way of example, a pre-processing stage may take place to collect user data and to create a general collaborative model based on collected data. For example, data about user interaction, user preferences, etc. may be collected from the UE 101, the service platform 107, and other devices, and then may be transferred to a server end (e.g. the service platform 107 and/or another service). The server end may use the collected data to generate the collaborative model. For example, the collected data may include information about the user and another user that the system 100 has determined to have a trust factor worth causing a recommendation to be sent to the user based on a similar or same role and/or preference assignments.

If the general collaborative model already exists in the UE 101, then the system 100 retrieves the recommendation from the general collaborative model within the UE 101. On the other hand, if there are no general collaborative models for the user within the UE 101, then the system 100 retrieves the recommendation from the general collaborative model at the server end. Also, if the system 100 determines that, although there is a general collaborative model for the user within the UE 101, there is an updated version of the general collaborative model for the user at the server end, the system 100 may utilize the updated version of the general collaborative model at the server end to retrieve the recommendation. A request to retrieve the recommendation or the updated version from the server end may include the user identifier and/or the application identifier.

Further, in one embodiment, the system 100 determines context information associated with a user and/or a device associated with the user that are associated with the user identifier, wherein the determination of a context-based recommendation rule and/or the processing of the context-based recommendation rule is based on the context information. The server end may include the context-based recommendation rule. There may be context-based recommendation rules corresponding to the user identifier, the context and the type of the context. Therefore, the context-based recommendation rule may be organized by a context and/or a context type. Further, the context information may include sensor data, user schedule, calendar, etc. The context-based recommendation rules may also depend on a type of the device. Also, the system 100 may also cause an initiation of the processing of the context-based recommendation rule based on a change to the context information. In this example, if the sensor 109 that is a location sensor indicates that the UE 101's location has been changed from the United States to the United Kingdom, then the processing of the context-based recommendation rule is initiated to utilize the context-based recommendation rule for the United Kingdom.

Therefore, an advantage of this approach is that different recommendations may be made for various types of scenarios based on the context data. Because this approach enables the system 100 to use recommendation models, context-based rules, and/or a hybrid of models and rules to generate recommendations, the system 100 can more closely capture user preferences for recommendations. Therefore, means for recommendations based on a recommendation model and/or a context-based rule are anticipated.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, the recommendation platform 103, the service platform 107 and the content provider 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIG. 2 is a diagram of the components of recommendation platform 103, according to one embodiment. By way of example, the recommendation platform 103 includes one or more components for making a recommendation to a user based on context information and a role comparison. It is contemplated that the functions of these components may be combined in one or more components or performed by other components of equivalent functionality. In this embodiment, the recommendation platform 103 includes a recommendation module 201, a role determination module 203, a trust calculation module 205, a data collection module 207, a role database 209 and a communication module 211.

In one embodiment, the recommendation module 201 processes information that is received from the role determination module 203, the trust calculation module 205, the data collection module 207, the role database module 209 and the communication module 211 to make a recommendation to a user, and communicate that recommendation to the user via communication module 211. A user's context information may be collected and processed by the data collection module 207 and considered in a role and/or context determination step by the recommendation module 201. The role determination module 203 may receive context information and an AUP from the data collection module to assign one or more roles or one or more role sets to a user. The role database module 209 may store, or have stored, role information about the user that may be used in a recommendation determination. The trust calculation module 205 may receive role information from the role determination module 203, the role database 209, and/or the communication module 211. The trust calculation module 205 may also receive context information about a user from the data collection module 207, and any behavioral information or preference information about the user or one or more other users from the communication module 211. The trust calculation module 211 then may compare all of the data and information available in to assign a trust factor to a relationship between users in a particular role or context, or in general. The trust factor that is generated may be considered by the recommendation module 201 when it performs a recommendation process to generate a recommendation for a user that is communicated to the user by way of the communication module 211.

Figure 10:
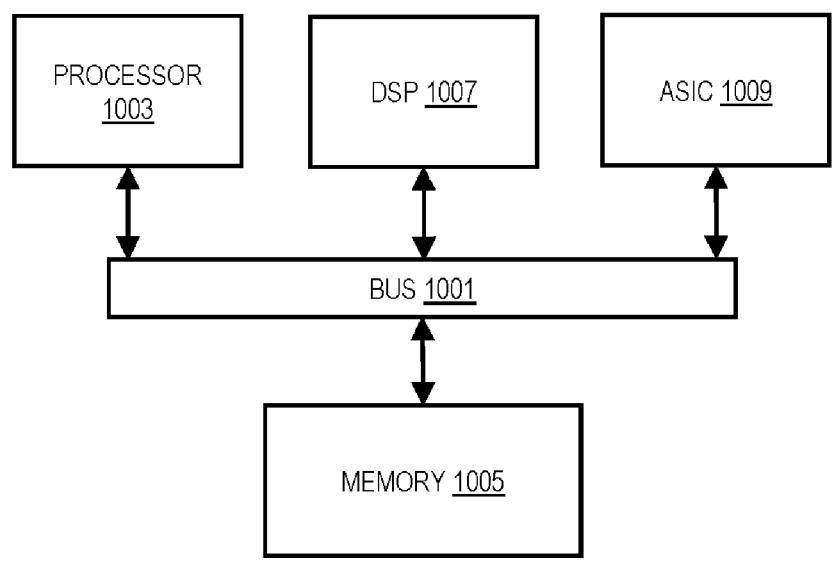
FIG. 10 is a diagram of a chip set that can be used to implement an embodiment of the invention.

FIGS. 3A-3D are flowcharts of processes for making a recommendation to a user based on context information and a role comparison, according to one embodiment. In one embodiment illustrated in FIG. 3A, the recommendation platform 103 performs the process 300 and is implemented in, for instance, a chip set including a processor and a memory as shown in FIG. 10. In step 301, the recommendation platform 103 processes context information and an AUP to determine one or more roles associated with the user. In step 303, the recommendation platform calculates at least one level of similarity between the one or more roles and one or more other roles associated with one or more other users. The process continues to step 305 in which the recommendation platform 103 determines the recommendation information associated with the one or more other users based, at least in part, on the at least one level of similarity. The process continues to step 307 in which the recommendation platform 103 processes the recommendation information to generate one or more recommendations for the user.

Figure 3A:
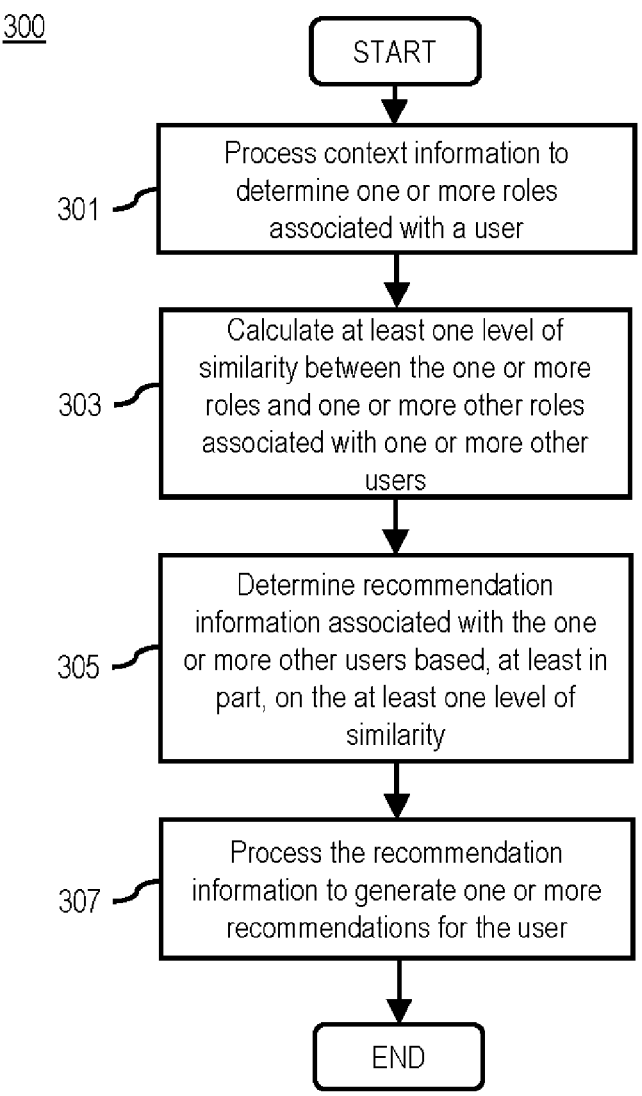
FIGS. 3A-3D are flowcharts of processes for making a recommendation to a user based on context information and a role comparison, according to one embodiment.
Figure 3B:
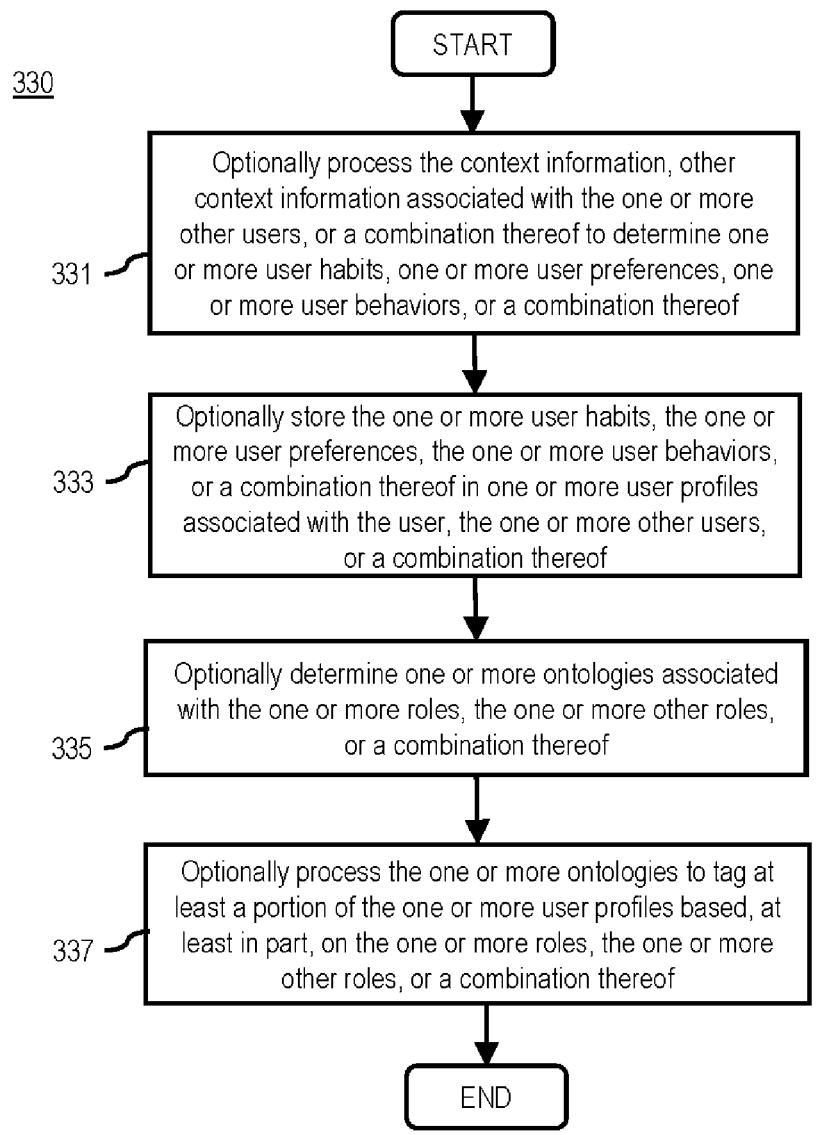

FIG. 3B is a flowchart of a process 330 for further enhancing the recommendation process illustrated in FIG. 3A. In step 331, the recommendation platform 103 optionally processes the context information, other context information associated with the one or more other users, or a combination thereof to determine one or more user habits, one or more user preferences, one or more user behaviors, or a combination thereof. The process continues to step 333 in which the recommendation platform 103 optionally stores the one or more user habits, the one or more user preferences, the one or more user behaviors, or a combination thereof in one or more user profiles associated with the user, the one or more other users, or a combination thereof. Next, in step 335, the recommendation platform 103 optionally determines one or more ontologies associated with the one or more roles, the one or more other roles or a combination thereof. The process optionally continues to step 337 in which the recommendation platform 103 processes the one or more ontologies to tag at least a portion of the one or more user profiles based, at least in part, on the one or more roles, the one or more other roles, or a combination thereof.

Figure 3C:
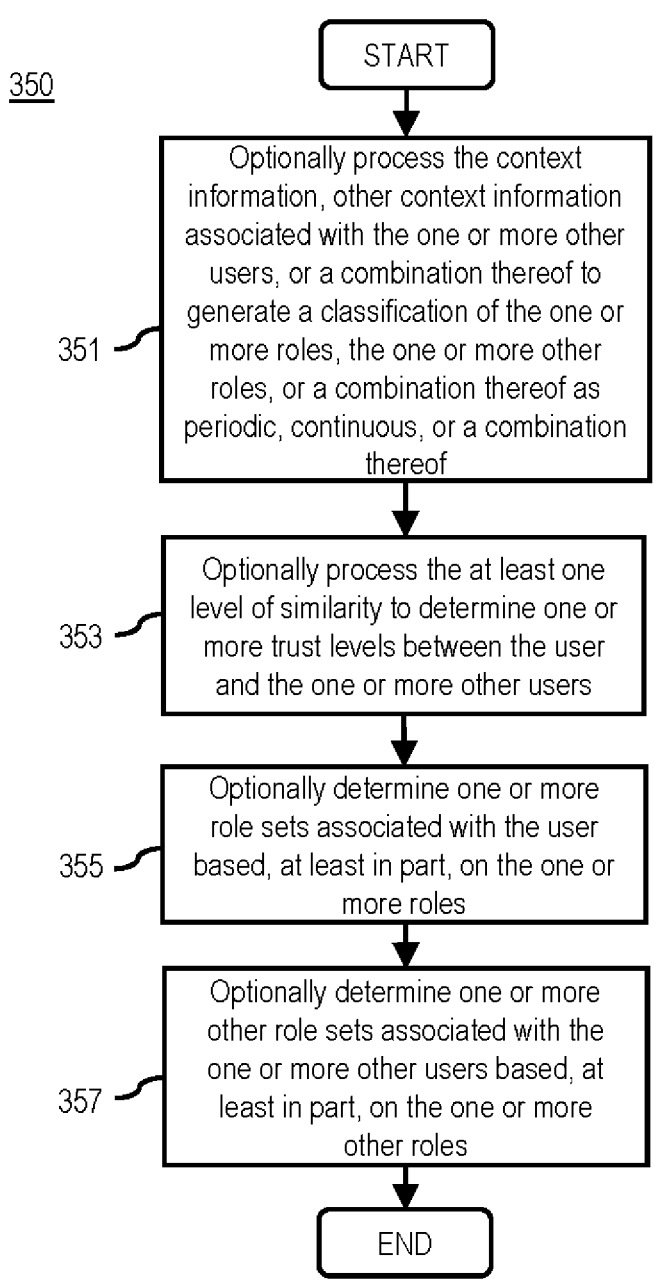

FIG. 3C is a flowchart of a process 350 for further enhancing the recommendation process illustrated in FIG. 3A. In step 351, the recommendation platform 103 optionally processes the context information, other context information associated with the one or more other users, an AUP or a combination thereof to generate a classification of the one or more roles, the one or more other roles, or a combination thereof as periodic, continuous, or a combination thereof. The process continues to step 353 in which the recommendation platform 103 optionally processes the at least one level of similarity it determine one or more trust levels between the user and the one or more other users. The process optionally continues to step 355 in which the recommendation platform 103 determines one or more role sets associated with the user based, at least in part, on the one or more roles. Next, the process optionally continues to step 357 in which the recommendation platform 103 optionally determines one or more other roles sets associated with the one or more other users based, at least in part, on the one or more other roles.

Figure 3D:
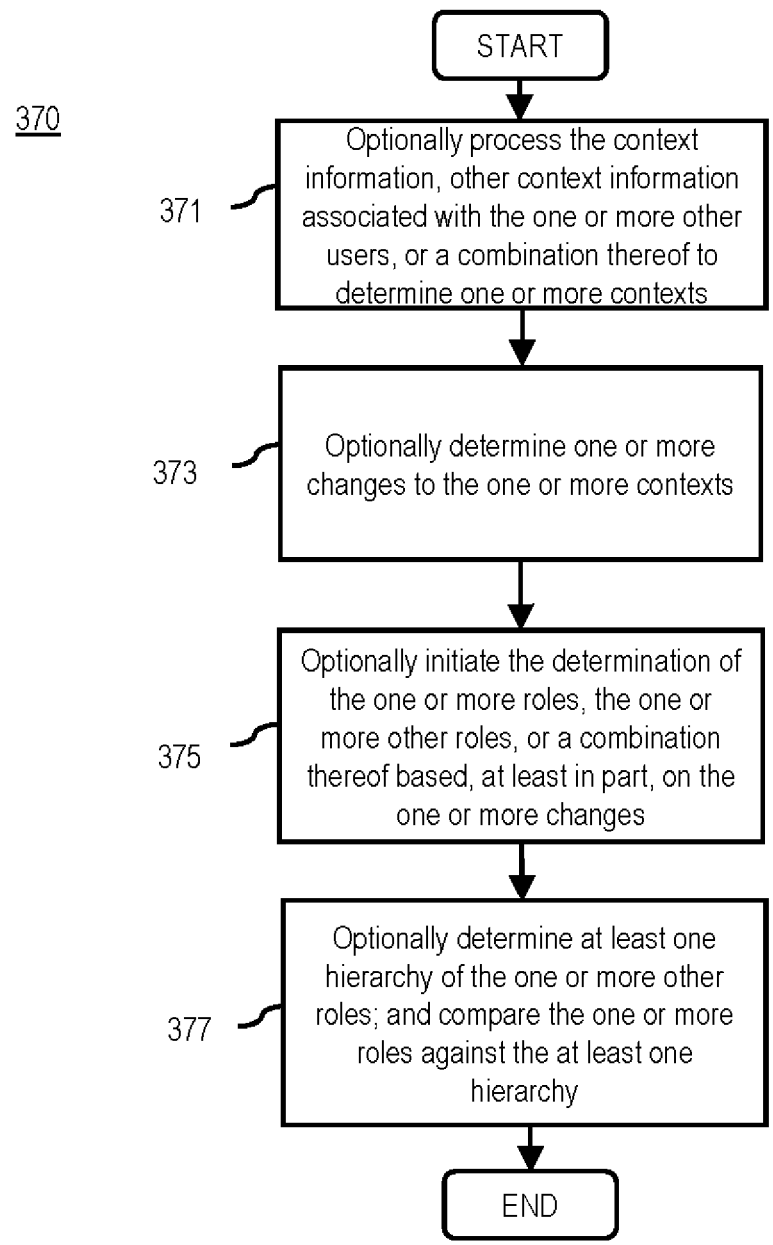

FIG. 3D is a flowchart of a process 370 for further enhancing the recommendation process illustrated in FIG. 3A. In step 371, the recommendation platform 103 optionally processes the context information, other context information associated with the one or more other users, or a combination thereof to determine one or more contexts. The process optionally continues to step 373 in which the recommendation platform 103 determines one or more changes to the one or more contexts. Next, the process optionally continues to step 375 in which the recommendation platform initiates the determination of the one or more roles the one or more other roles, or a combination thereof based, at least in part, on the one or more changes. The process optionally continues to step 377 in which the recommendation platform determines at least one hierarchy of the one or more other roles; and compare the one or more roles against the at least one hierarchy.

Figure 4:
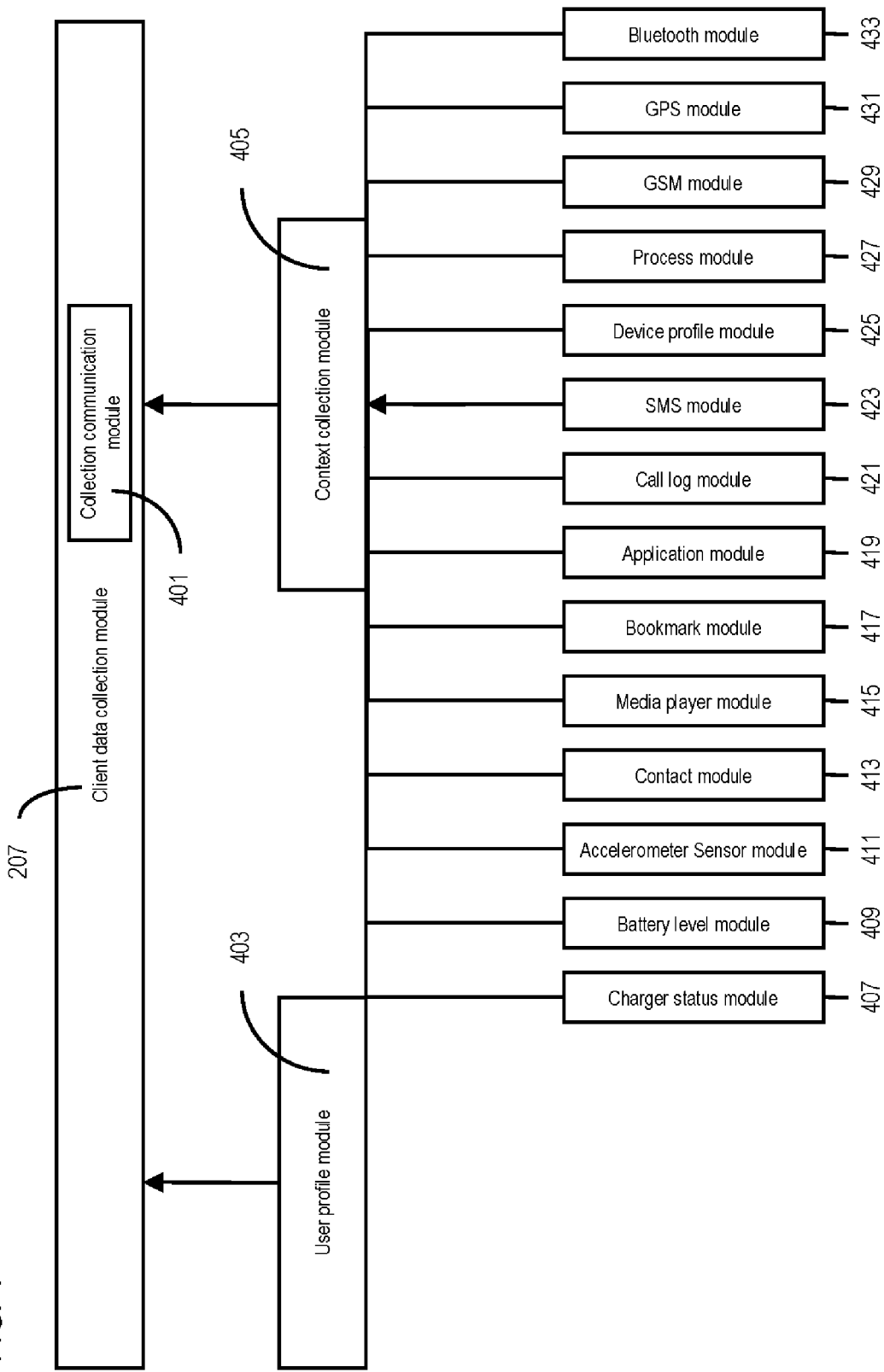
FIG. 4 is a diagram of the components of the data collection module, according to one embodiment.

FIG. 4 is a diagram of the components of the data collection module 207, according to an example embodiment. The data collection module 207 has a collection communication module 401 that communicates with a user profile module 403 and a context collection module 405. A client application like Nokia Simple Context may be used to collect user context data as the context collection module 405, for example. The application may be installed at UE 101 and automatically run in UE 101 as a daemon to collect dynamically context information. Context data including, for example, application, device profile, Bluetooth devices, call log, contact, GPS, GSM (e.g., wireless network), message, media player, system process, etc. may be collected by way of respective modules such as charger status module 407, battery level module 409, accelerometer sensor module 411, contact module 413, media player module 415, bookmark module 417, application module 419, call log module 421, SMS module 423, device profile module 425, process module 427, GSM module 429, GPS module 431 and Bluetooth module 433, for example. The user profile module 403 may also be used to collect user profile data, for example. The application may collect data according to a certain sample rate, and the application may be customizable in the UE 101. Such customizations may include whether to collect that particular data type or not, a sample rate setting, and whether to send the collected information to a server, for example.

Figure 5:
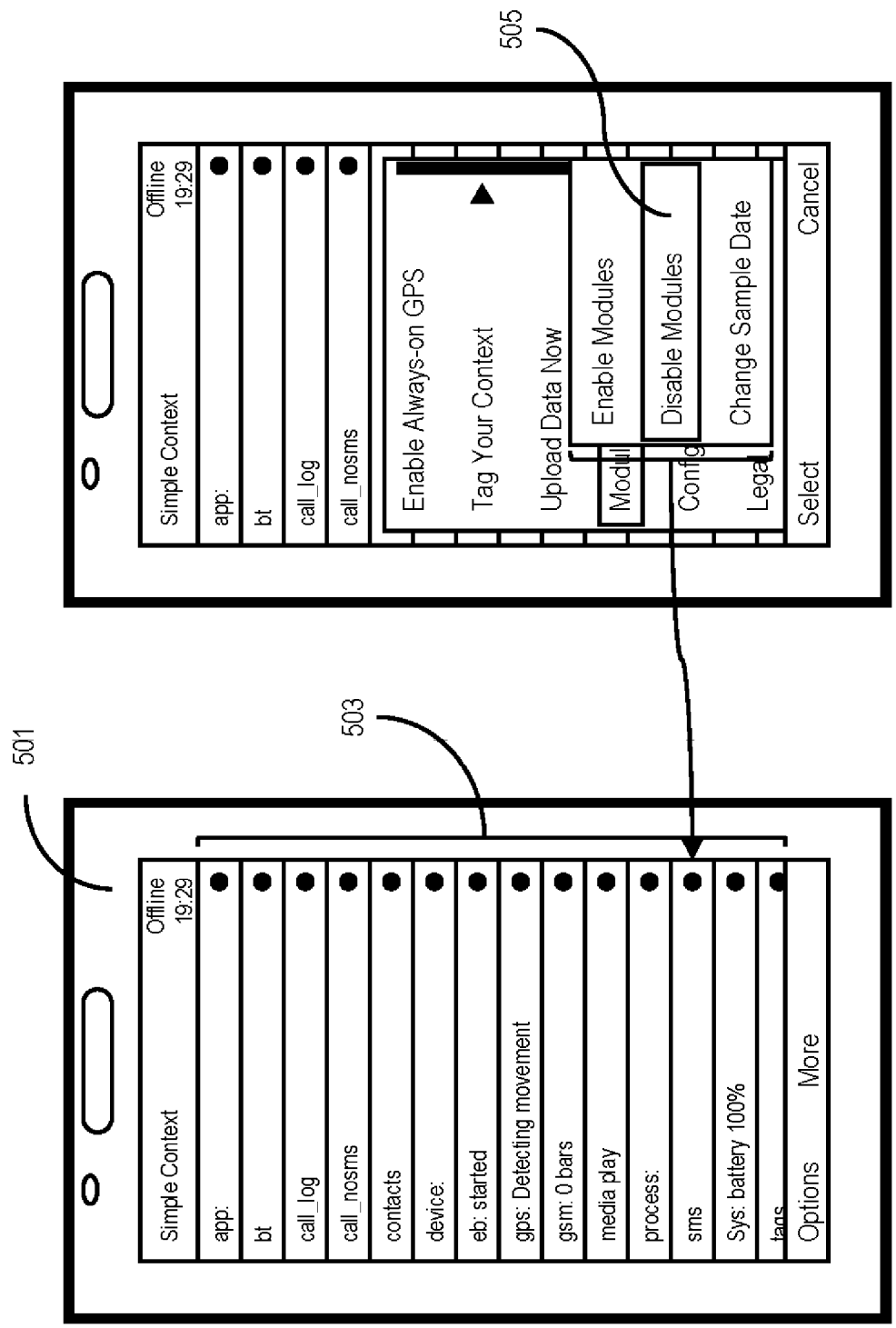
FIG. 5 is a diagram of a user interface for setting preferences, according to one embodiment.

FIG. 5 is a diagram of an example user interface 501 that illustrates example data types 503. When at least one of the data types 503 are selected, an enablement window 505 appears over the data types 503 and enables a user to select whether to enable that particular data type for collection by the collection module 207. For example, a user may elect to enable or disable a GPS module that is part of the UE 101 so that movement may or may not be detected and considered in the determination for making a recommendation to the user.

Figure 6:
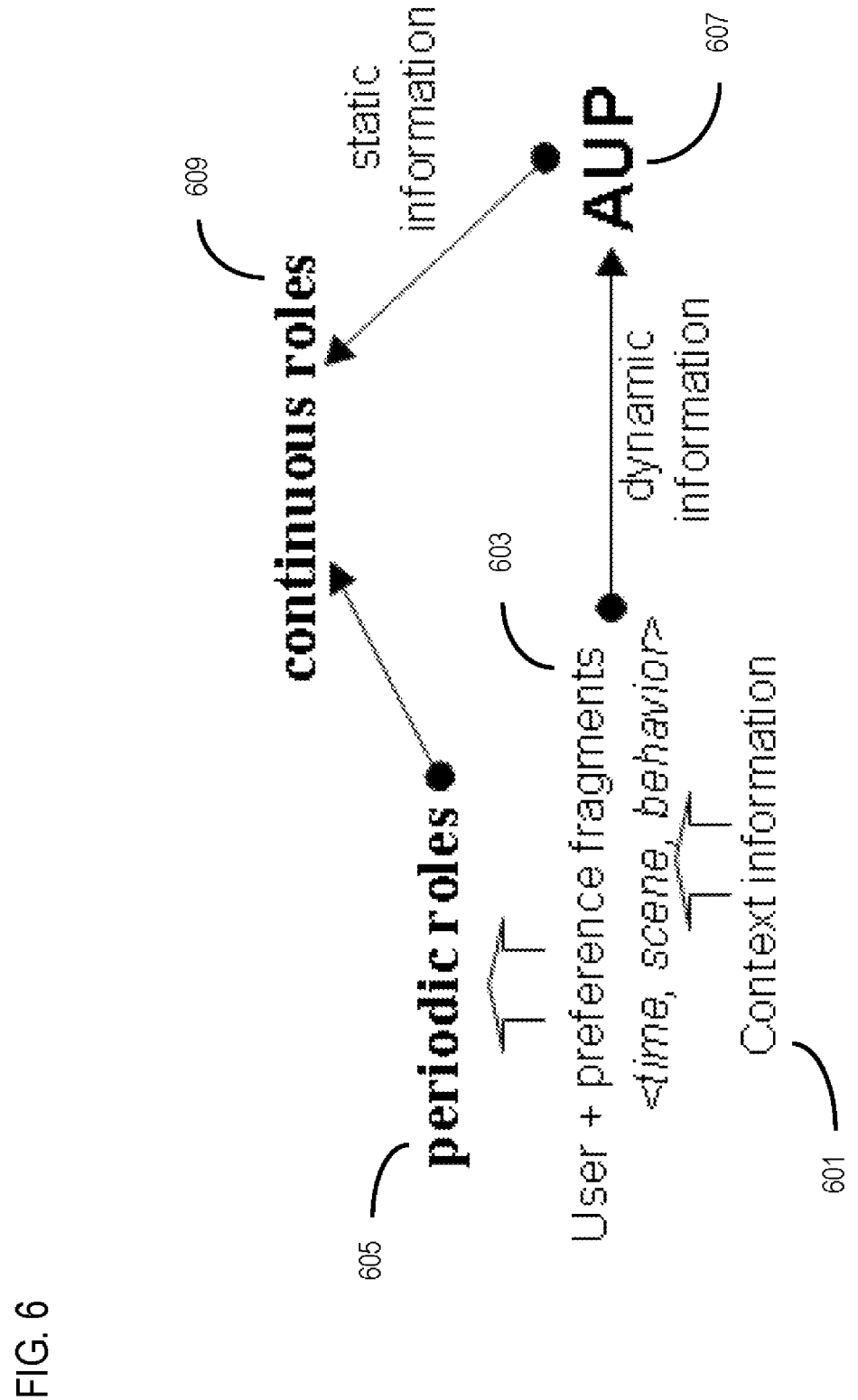
FIG. 6 is a diagram illustrating a hierarchy of role mining elements; according to one embodiment.

FIG. 6 is an illustration of the example types of information that is collected and processed by the system 100 to determine whether a role is periodic or continuous, or whether the information is information that is best assigned to an AUP. Context information 601 about a user is collected and parsed into user and preference fragments 603 such as <time, scene, behavior>. Once parsed, the system 100 may determine that the information should be assigned a periodic role 605 or a continuous role 609. Potential periodic roles 605 are discovered by clustering the preferences of all users in AUPs 607. Two mapping tables may be extracted: a user-role table, which denotes which roles that each user can play, and a role-context-behavior table, which recognizes the characteristics of each role, that is, which behavior a role may have under a certain context. A role concept lattice (hierarchy) can be generated from the discovered or mined periodic roles, and provides a basis for mapping between the mined roles and manually constructed roles in the AUP 607. The mapping relations between the periodic roles 605 may be built in AUP ontology and the concept lattice of the potential periodic roles 605. Continuous roles 609 are mined based on static information in AUPs 607 and periodic roles 605. For example, if a group of users of a similar age frequently play the same periodic roles 605, all of them possibly play a potential continuous role 609. The result is that real-time role recognition becomes an inverse process once the information in AUP 607 and the current user's context information 601 are known.

Figure 7:
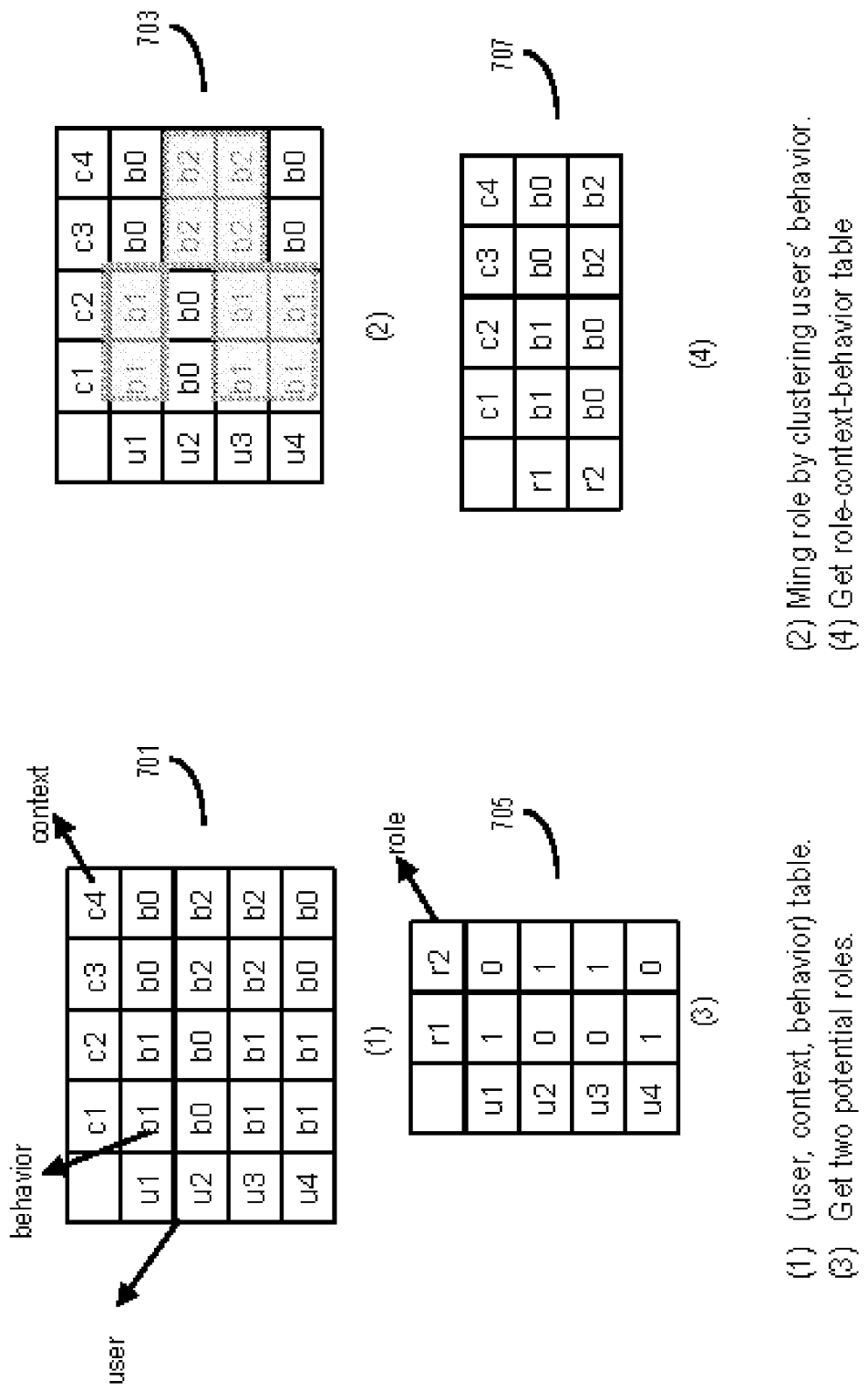
FIG. 7 is an illustration of role mapping tables for determining one or more roles for one or more users, according to one embodiment.

FIG. 7 illustrates example mapping tables 701, 703, 705 and 707. Mapping table 701 is a user, context, behavior table that illustrates various users u1-u4, contexts c1-c4 and behaviors b0-b2. The context here denotes the combination (Cartesian product) of time and scene. During role mining, the user-context-behavior table 701 can be constructed from the preferences in an AUP, which denotes which behavior a user may have under a certain context. In this example, $ui(i=1.4)$ denotes 4 users, $ci(i=1.4)$ denotes 4 contexts, $bi(i=1,2)$ denotes 2 behaviors, b0 denotes "No action". Mapping table 703 illustrates a mining or assigning of roles based on the available context, behavior and user information by clustering areas of the mapping table 703 that have the same designated behaviors (b1 and b2, for example). Mapping table 705 indicated that two roles, r1 and r2 can be recognized and the relation between each user with these roles can be created. Mapping table 707 is a role-context-behavior table that shows which behavior a role may have under a certain context.

Figure 8:
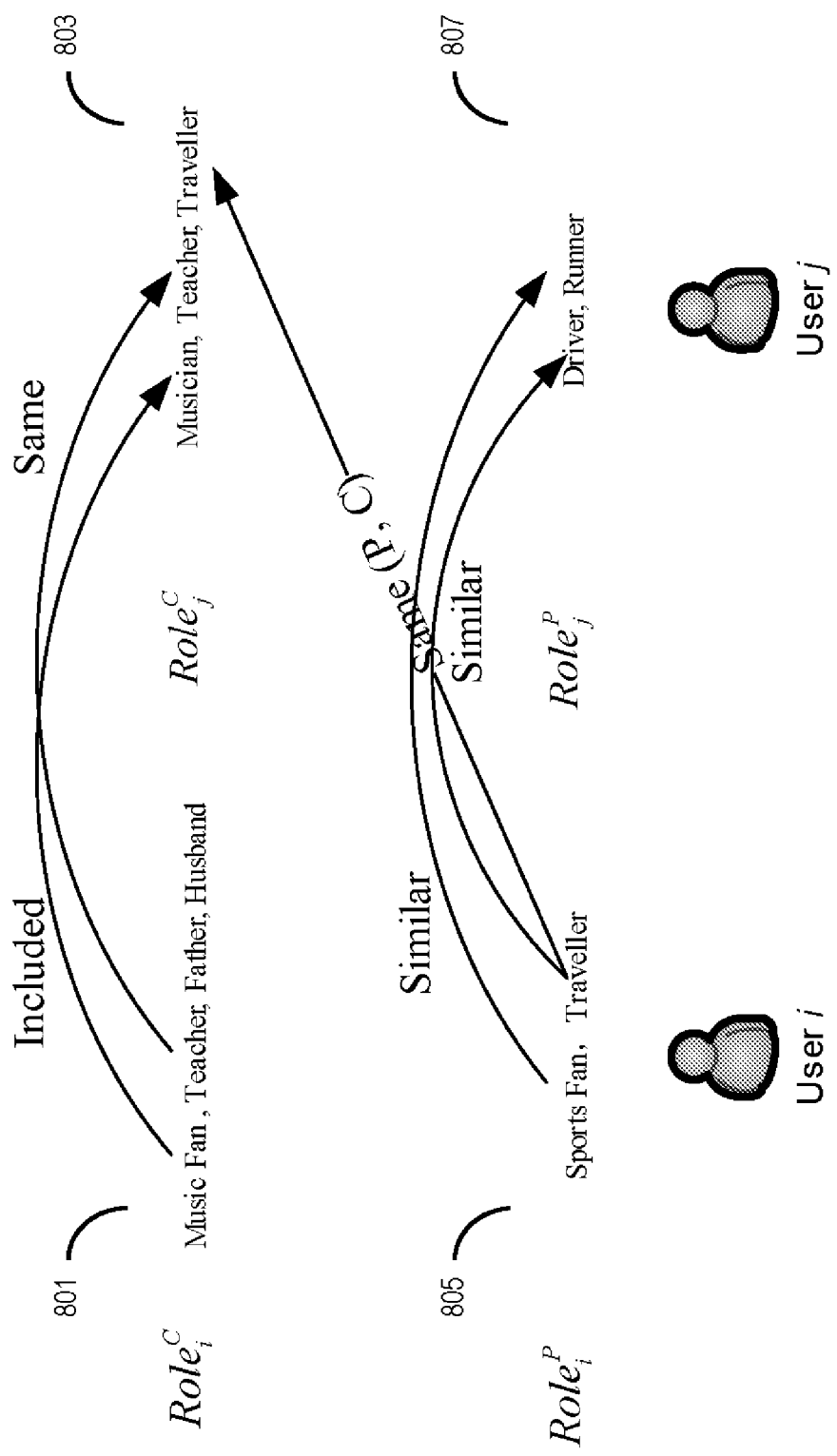
FIG. 8 is an illustration of a trust calculation for matching roles shared between users, according to one embodiment.

FIG. 8 is an example trust calculation illustration in which two users, i and j, are compared to calculate a trust factor. Role Ci 801 illustrates context based roles about user i. The context based roles in role Ci are {Music Fan, Teacher, Father, Husband}. These roles may be detected and assigned using any means discussed above with regard to the context collection module 209, for example, or any other determining means for assigning roles as discussed above in FIG. 7. Similarly, user j has a role Cj illustration 803 that includes roles {Musician, Teacher, Traveler}. User i has a preferences role set, role Pi 805 that illustrates interests set by the user as preferences {Sports Fan, Traveler}, and user j has a preferences role set, role Pj 807 set by user j as {Driver, Runner}. The system 100 may calculate a trust factor by considering an explicit trust statement from user i to user j such as a selection or indication that user i wants all recommendations based on user j's interests because he trusts anything that is generated from user j, a similarity between the role sets 801-807 and a similarity between the users' ratings (user profiles, for example). A trust network may be created, as discussed above, based on aggregating any trust factors that are determined and also consider trust and distrust propagation.

In determining the trust factor, a same or similar continuous role may contribute to a high trust impact, and a same or similar periodic role may contribute to a low trust impact. In weighing particular roles to determine a trust factor, the following nomenclature may be used to designated the relationship between roles: Included (Highest), Same (Higher), Include (High score), Similar (low score), No similar roles (no score).

In the example illustrated in FIG. 8, user i is compared to user j and certain roles of the role sets 801-807 are designated as included, same, or similar. For example, a traveler is designated as a same because it appears in both user's roles identically. Music fan and musician are designated as included because they are preset to fall within the same interest field, but are not identical. Sports fan and runner are designated as being similar because while they are both related to sports, they could be classified as being too far attenuated to be included. Settings for determining that roles should be similar, included, same, or not similar may be based on preferences set for developing the above mentioned hierarchy, for example. When developing a hierarchy, the hierarchy may be described in the context of employees in a business. Take salesmen, for example. In a business there may be a director of sales, a sales manager and a salesman. All three of the employees are in sales, but only one is a director and one is a manager. Depending on the role comparison at hand, which may be based on context information, the hierarchy may be important when comparing what role a user is in at any given time to other users. As such, some roles may not be as important as others when making a recommendation to a user.

The processes described herein for making a recommendation to a user based on context information and a role comparison may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
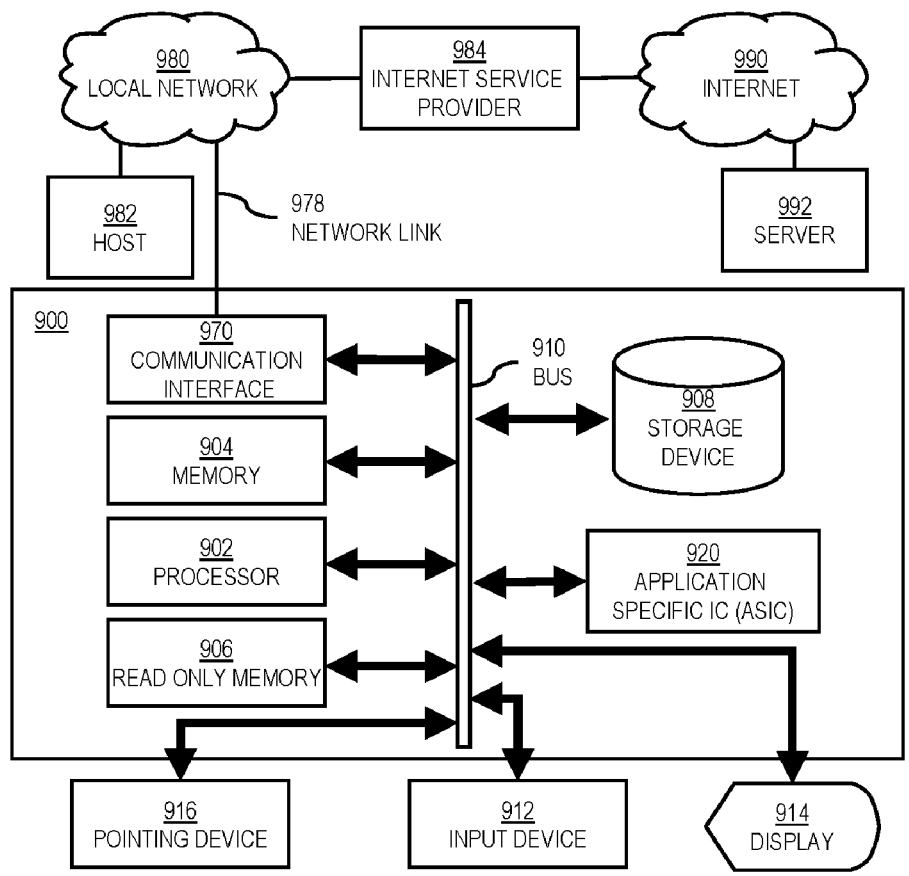
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to make a recommendation to a user based on context information and a role comparison as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of making a recommendation to a user based on context information and a role comparison.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to make a recommendation to a user based on context information and a role comparison. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for making a recommendation to a user based on context information and a role comparison. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for making a recommendation to a user based on context information and a role comparison, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for making a recommendation to a user based on context information and a role comparison to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to make a recommendation to a user based on context information and a role comparison as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of making a recommendation to a user based on context information and a role comparison.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to make a recommendation to a user based on context information and a role comparison. The memory 1005 also stores the data associated with or generated by the execution of the inventive steps.

Figure 11:
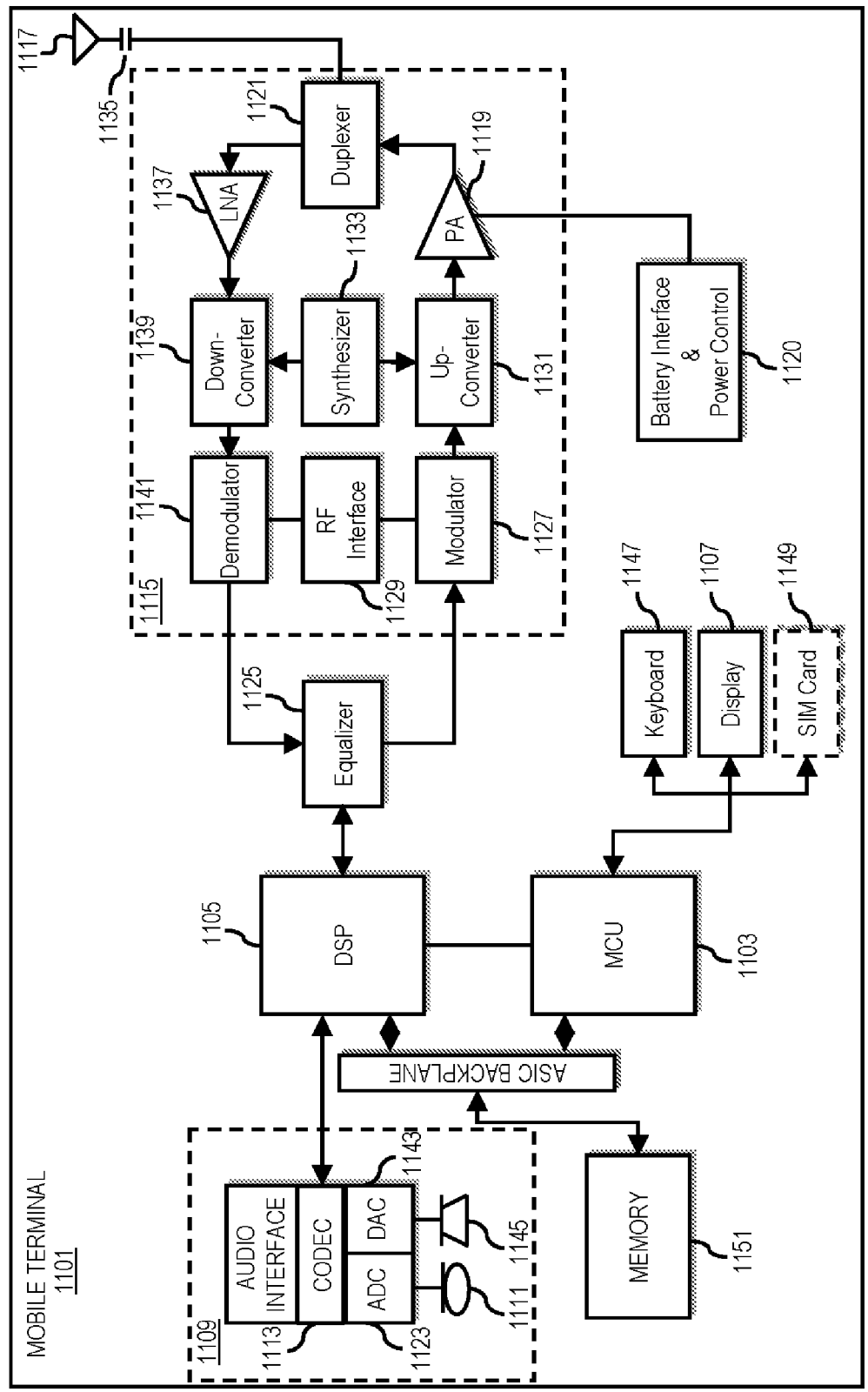
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of making a recommendation to a user based on context information and a role comparison. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of making a recommendation to a user based on context information and a role comparison. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to make a recommendation to a user based on context information and a role comparison. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

The invention claimed is:

1. A method comprising:
processing context information to determine a plurality of information fragments associated with a user, wherein the information fragments parse the context information according to a time, a location of the user at the time, and a behavior of the user at the time and the location, wherein the behavior includes a physical activity other than a user interaction with a software application;
designating the time and the location as a context;
retrieving one or more profiles associated with the user, wherein the one or more profiles include one or more behavior patterns, demographic information, preference information, or a combination thereof associated with the user;
determining a set of roles and corresponding role types associated with the user based on the context, the behavior, and the one or more profiles, wherein the set of roles is determined by comparing the behavior, the context, and the one or more profiles to a role behavior, a role context, and a role profile previously mapped to the set of roles, and wherein the role behavior, the role context, and the role profile are determined from a group of users, wherein the corresponding role types include a continuous role and a periodic role;
calculating at least one level of similarity between the set of roles associated with the user and one or more other sets of roles associated with one or more other users using the corresponding role types as weighing;
processing the at least one level of similarity to determine one or more trust levels between the user and the one or more other users using the corresponding role types as weighing, wherein the one or more trust levels are asymmetric, and a trust level of an identical continuous role shared between users is higher than a trust level of an identical periodic role shared between users;
determining recommendation information associated with the one or more other users based on the one or more trust levels; and
processing the recommendation information to generate one or more recommendations for the user.

2. A method of claim 1, wherein the recommendation information includes one or more collaborative recommendation models, one or more recommendation rules, or a combination thereof.

3. A method of claim 1, further comprising:
processing one or more user profiles to determine additional context information associated with the user; and
processing the additional context information with the context information to determine the context and the behavior associated with the user,
wherein the set of roles is determined based on the context and the behavior that are determined from the additional context information and the context information.

4. A method of claim 3, further comprising:
storing the plurality of information fragments, the context, the behavior, or a combination thereof in the one or more user profiles associated with the user.

5. A method of claim 3, wherein the plurality of information fragments is represented in a data format including a triple built according to a resource description framework, and wherein the triple includes a time field, a location field, and a behavior field.

6. A method of claim 5, wherein the triple is a human-readable semantics triple.

7. A method of claim 1, further comprising:
determining one or more ontologies associated with the set of roles, the one or more other sets of roles, or a combination thereof and
processing the one or more ontologies to tag at least a portion of the one or more user profiles based, at least in part, on the set of roles, the one or more other sets of roles, or a combination thereof.

8. A method of claim 7, wherein the calculation of the at least one level of similarity is further based on the tagging of at least a portion of the one or more user profiles.

9. An apparatus comprising:
at least one processor; and
at least one memory including computer program code for one or more programs,
the at least one memory and the computer program code configured to, with the at least one processor, cause the apparatus to perform at least the following,
process context information to determine a plurality of information fragments associated with a user, wherein the information fragments parse the context information according to a time, a location of the user at the time, and a behavior of the user at the time and the location, wherein the behavior includes a physical activity other than a user interaction with a software application;
designate the time and the location as a context;
determine a set of roles and corresponding role types associated with the user based on the context, the behavior, and the one or more profiles, wherein the set of roles is determined by comparing the behavior, the context, and the one or more profiles to a role behavior, a role context, and a role profile previously mapped to the set of roles, and wherein the role behavior, the role context, and the role profile are determined from a group of users, wherein the corresponding role types include a continuous role and a periodic role;
calculate at least one level of similarity between the set of roles associated with the user and one or more other sets of roles associated with one or more other users using the corresponding role types as weighing;

process the at least one level of similarity to determine one or more trust levels between the user and the one or more other users using the corresponding role types as weighing, wherein the one or more trust levels are asymmetric, and a trust level of an identical continuous role shared between users is higher than a trust level of an identical periodic role shared between users;

determine recommendation information associated with the one or more other users based on the one or more trust levels; and process the recommendation information to generate one or more recommendations for the user.

10. An apparatus of claim 9, wherein the apparatus is further caused to:

process one or more user profiles to determine additional context information associated with the user; and process the additional context information with the context information to determine the context and the behavior associated with the user, wherein the set of roles is determined based on the context and the behavior that are determined from the additional context information and the context information.

11. An apparatus of claim 10, wherein the apparatus is further caused to store the plurality of information fragments, the context, the behavior, or a combination thereof in the one or more user profiles associated with the user.

12. An apparatus of claim 10, wherein the plurality of information fragments is represented in a data format including a triple built according to a resource description framework, and wherein the triple includes a time field, a location field, and a behavior field.

13. An apparatus of claim 9, wherein the apparatus is further caused to:

determine one or more ontologies associated with the set of roles, the one or more other sets of roles, or a combination thereof; and process the one or more ontologies to tag at least a portion of the one or more user profiles based, at least in part, on the set of roles, the one or more other sets of roles, or a combination thereof.

14. An apparatus of claim 13, wherein the calculation of the at least one level of similarity is further based on the tagging of at least a portion of the one or more user profiles.

* * * * *